H. FEENDERS.
CLOD CRUSHER AND DRAG.
No. 181,427.  Patented Aug. 22, 1876.
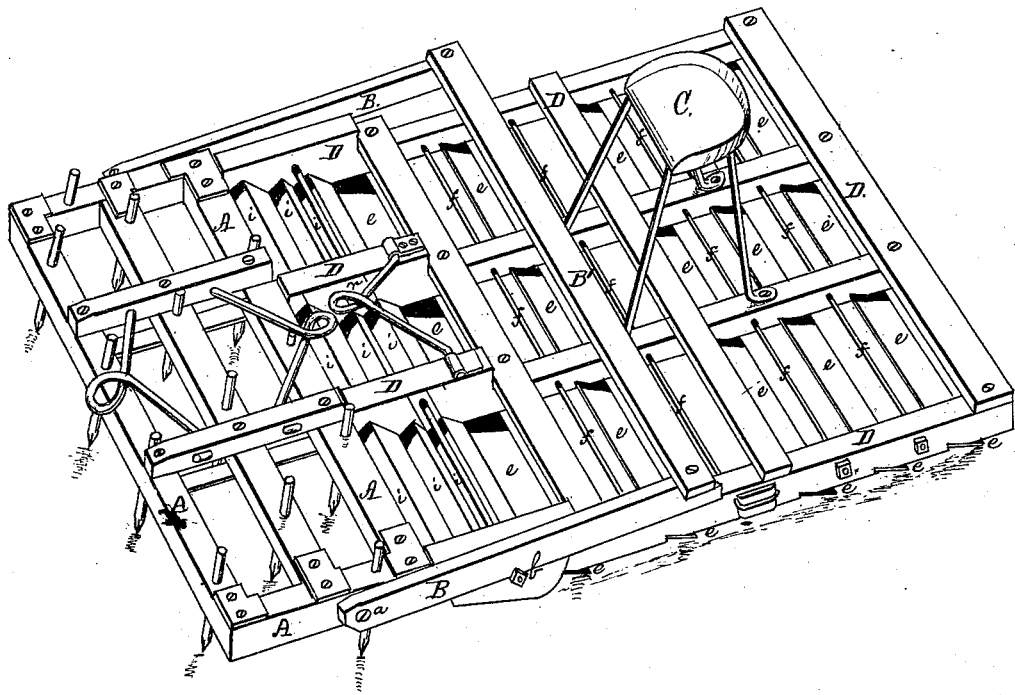
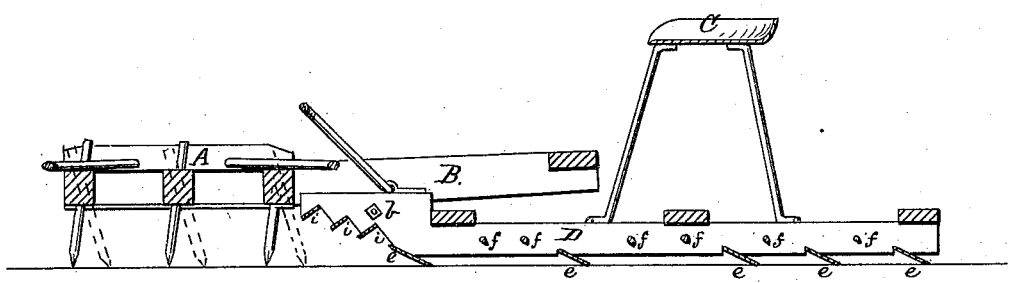

UNITED STATES PATENT OFFICE.

HARM FEENDERS, OF CHARLES CITY, IOWA.

IMPROVEMENT IN CLOD-CRUSHERS AND DRAGS.

Specification forming part of Letters Patent No. 181,427, dated August 22, 1876; application filed March 4, 1876.

*To all whom it may concern:*

Be it known that I, HARM FEENDERS, of Charles City, Floyd county, Iowa, have invented an Improvement in Clod-Crushers and Drags; and I do hereby declare the following to be a full and correct description of the same, reference being had to the accompanying drawings, in which—

Figure 1 is a perspective view of my invention, and Fig. 2 is a vertical section of the same.

The object of my invention is to produce an improved clod-crusher and pulverizing apparatus, by which the ground may be pulverized, clods cut and broken up, and the ground pressed down evenly upon the sown grain, obviating the use of a roller, and leaving the surface in an even, yet mellow, condition; and my invention consists in combining a reversible or pivoted drag with a crusher or cutter, having one series of knives or blades, so set and arranged as to cut up the clods, and another series of blades arranged to press down the earth and give an even surface to the ground upon the sown grain or seed.

My device also has a series of wires, which are intended to agitate the ground and prevent the crusher from choking.

In the drawing, A represents the drag or harrow, which is made in the usual manner, with the teeth set at an angle with the frame, so that by drawing the drag either way the teeth can be made to slant forward or backward, so as to rake the ground much or little. This drag A is pivoted, by means of the pivots $a$, between the two arms B, which are connected together by the cross-piece B'. The drag A is constructed in the usual manner, and has two hitching-rings, one on either side, so that it may be used reversed by means of the removable pivot-bolts $a$. The arms B are also pivoted by means of the pivots $b$; and the cross-piece being in front of the seat C, and in position to be pressed down by the feet of the driver, it is plain that the drag may be raised from the ground by the pressure of the driver upon the cross-piece B', so that in stony places, or for other reasons, the drag may be thrown out of use by the will of the driver.

In the rear of the drag A, and attached to it by means of the arms B and pivots $a$ and $b$, is a clod-crusher and frame, D. Frame D is of the ordinary construction of harrow-frames, with the exception that the front rises somewhat above the ground.

Instead of teeth in the frame D, there are blades $e$ secured to the bottom of the frame, with their under surfaces inclining backward; and between said blades there are one or more wires or rods, $f$, passing through the sides of the frame, with nuts on the outside to draw them tight.

The object of the blades $e$ is to press down the earth after it has been leveled by the drag, and, like a trowel, smooths the surface and presses the earth around the seed, while it leaves the ground mellow.

It will be noticed that the blades may be placed as near together as is desirable. We prefer to have them nearer together at the rear end, under and back of the seat C, placed upon the top.

The object of the rods $f$ is to agitate the earth between the blades $e$ and prevent the drag from clogging.

In the front part of the crusher D, upon a somewhat raised portion of the frame, are blades $i$, inclined in a forward direction and somewhat sharpened. These blades, arranged in a step-like manner, are intended to cut the clods that lie upon the ground, and guide the pieces under the blades $e$, where they will be either pulverized or pressed down into the ground.

On the top of the forward part of the crusher D is a draft ring or yoke, $r$, similar to the draft-rings on the drag A, by which the crusher may be used without the drag A, when the farmer may deem it necessary.

In the operation of my invention the driver, seated upon the seat C and driving the team, can, by pressing his feet upon the cross-piece B', raise the drag either one end or both, and thus shun stony places or stumps without stopping the team.

Having thus fully described my invention, what I claim, and desire to secure by Letters Patent, is—

1. A clod-crusher provided with forwardlyinclined knives for cutting the clods, and backwardly-inclined blades for smoothing the earth, and intervening wires for preventing the crusher from clogging, substantially as described.

2. In combination with a clod-crusher having knives $i$, blades $e$, and rods $f$, substantially as described, the reversible drag A, pivoted upon the arms B B', as and for the purpose set forth.

The above specification of my said invention signed and witnessed, at Charles City, this 29th day of February, A. D. 1876.

HARM FEENDERS.

Witnesses:
 FRED. C. DANFORTH,
 K. H. COOK.